United States Patent
Boggs et al.

(10) Patent No.: US 10,642,744 B2
(45) Date of Patent: May 5, 2020

(54) MEMORY TYPE WHICH IS CACHEABLE YET INACCESSIBLE BY SPECULATIVE INSTRUCTIONS

(71) Applicant: NVIDIA Corporation, Santa Clara, CA (US)

(72) Inventors: Darrell D. Boggs, Hillsboro, OR (US); Ross Segelken, Portland, OR (US); Mike Cornaby, Hillsboro, OR (US); Nick Fortino, San Jose, CA (US); Shailender Chaudhry, Santa Clara, CA (US); Denis Khartikov, Beaverton, OR (US); Alok Mooley, Daly City, CA (US); Nathan Tuck, Corvallis, OR (US); Gordon Vreugdenhil, Tigard, OR (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/022,274

(22) Filed: Jun. 28, 2018

(65) Prior Publication Data

US 2019/0004961 A1 Jan. 3, 2019

Related U.S. Application Data

(60) Provisional application No. 62/526,236, filed on Jun. 28, 2017.

(30) Foreign Application Priority Data

Jun. 27, 2018 (WO) ............... PCT/US2018/039766

(51) Int. Cl.
*G06F 12/0875* (2016.01)
*G06F 9/38* (2018.01)
(Continued)

(52) U.S. Cl.
CPC ........ *G06F 12/0875* (2013.01); *G06F 9/3842* (2013.01); *G06F 12/0811* (2013.01);
(Continued)

(58) Field of Classification Search
CPC ................................................. G06F 12/00–16
See application file for complete search history.

(56) References Cited

U.S. PATENT DOCUMENTS

| 5,680,565 | A | * | 10/1997 | Glew | .................... | G06F 9/3834 |
| | | | | | | 711/205 |
| 6,769,049 | B1 | * | 7/2004 | Bernard | .............. | G06F 9/30072 |
| | | | | | | 711/154 |

(Continued)

OTHER PUBLICATIONS

Kocher, Paul, et al., "Spectre Attacks: Exploiting Speculative Execution," arXiv:1801.01203 [cs.CIR] (2018), published at https://meltdownattack.com/, 16 pages.

(Continued)

*Primary Examiner* — Nicholas J Simonetti
(74) *Attorney, Agent, or Firm* — Nixon & Vanderhye PC (57) ABSTRACT

An improved architectural means to address processor cache attacks based on speculative execution defines a new memory type that is both cacheable and inaccessible by speculation. Speculative execution cannot access and expose a memory location that is speculatively inaccessible. Such mechanisms can disqualify certain sensitive data from being exposed through speculative execution. Data which must be protected at a performance cost may be specifically marked. If the processor is told where secrets are stored in memory and is forbidden from speculating on those memory locations, then the processor will ensure the process trying to access those memory locations is privileged to access those locations before reading and caching them. Such countermeasure is effective against attacks that use speculative execution to leak secrets from a processor cache.

24 Claims, 4 Drawing Sheets

(51) Int. Cl.
*G06F 12/0888* (2016.01)
*G06F 12/0811* (2016.01)
*G06F 12/1027* (2016.01)
*G06F 12/1009* (2016.01)

(52) U.S. Cl.
CPC ...... *G06F 12/0888* (2013.01); *G06F 12/1009* (2013.01); *G06F 12/1027* (2013.01); *G06F 2212/1052* (2013.01); *G06F 2212/452* (2013.01); *G06F 2212/507* (2013.01); *G06F 2212/653* (2013.01)

(56) References Cited

U.S. PATENT DOCUMENTS

| | | | |
|---|---|---|---|
| 2003/0033510 A1* | 2/2003 | Dice | G06F 9/383 712/235 |
| 2006/0101226 A1* | 5/2006 | Benhase | G06F 12/1081 711/203 |
| 2009/0089564 A1 | 4/2009 | Brickell et al. | |

OTHER PUBLICATIONS

Lipp, Moritz, et al., "Meltdown," arXiv:1801.01207 [cs.CIR] (2018), published at https://meltdownattack.com/, 16 pages.

International Search Report and Written Opinion of the International Searching Authority dated Oct. 11, 2018, issued in related International Application No. PCT/US2018/039766, 13 pages.

Kong, Jingfei, et al., "Hardware-Software Integrated Approaches to Defend Against Software Cache-based Side Channel Attacks," IEEE 15th International Symposium on High Performance Computer Architecture, 2009, pp. 393-404, XP031950212.

Lehman, Tamara Silbergleit, et al., "PoisonIvy: Safe Speculation for Secure Memory," 49th Annual IEEE/ACM International Symposium on Microarchitecture, 2016, 13 pages, XP033022484.

International Preliminary Report on Patentability and Written Opinion in corresponding PCT/US2018/039766, dated Dec. 31, 2019, 7 pages.

* cited by examiner

MEMORY TYPE WHICH IS CACHEABLE YET INACCESSIBLE BY SPECULATIVE INSTRUCTIONS

CROSS-REFERENCE TO RELATED APPLICATIONS

Benefit of priority is claimed from U.S. provisional application No. 62/526,236 filed Jun. 28, 2017, incorporated herein by reference.

STATEMENT REGARDING FEDERALLY SPONSORED RESEARCH OR DEVELOPMENT

None.

FIELD

The technology herein relates to computer security, and more particularly to CPU designs with improved security. Still more particularly, the example non-limiting technology herein relates to a processor that supports a speculatively-inaccessible memory type which is cacheable yet inaccessible by speculative instructions or speculative execution.

BACKGROUND

Modern high-performance CPUs utilize speculative execution paths to improve instruction throughput. One form of speculative execution is branch prediction. Branch prediction enables the processor to begin executing instructions before the true branch path is known. When encountering branching code such as "if x, do foo; else do bar," the CPU tries to predict what x will be and begins executing foo or bar before x is known. If the CPU predicts correctly, execution continues with the added performance benefit. If the CPU predicts incorrectly, the result of the speculative execution is discarded.

Similarly, some CPUs engage in value speculation to generate values that are either predicted or computed using a predicted value.

CPU loads can also be performed speculatively. For example, if foo is being executed speculatively and foo requires a load, that load will be performed along with the speculative execution of the foo branch. Such speculative loads, however, can lead to security risks.

Malicious code may attempt to exploit a CPU's speculative load to gain access to locations in memory that would otherwise be architecturally impermissible. For example, a code block may conditionally request a load from an impermissible memory location. Speculative loading will cause the CPU to load data from this impermissible memory location before determining whether the memory access is permissible. In the normal case, this speculative load (and impermissible memory access) will not be accessible to the underlying code because the speculative load will be rolled back and made inaccessible when the impermissible memory access is detected. But unfortunately, this may not be the end of the story.

Malicious coders can be quite ingenious. Even though a speculative load will be rolled back and made inaccessible when impermissible memory access is detected, it is possible for an attacker to determine the value of a speculative load from an impermissible memory location by adding a second speculative load that is dependent on the value of the first speculative load. For example, a code block may request a load from memory location A if the value of the first speculative load is 0 and from memory location B if the value of the first speculative load is 1. Even after the impermissible memory access is detected and rolled back, it is still possible to determine which of the memory locations A or B was loaded because they will remain present in the processor's L1 cache. Thus, any subsequent requests to memory locations A or B will reveal, based on the timing of the response, whether those memory locations are present in the L1 cache. If it is revealed that memory location A is present in the L1 cache, the value at the impermissible memory location must have been 0. If memory location B is present in the L1 cache, the value at the impermissible memory location must have been 1. In this way, it is possible to determine (deduce) the value stored at an arbitrary memory location even when access is architecturally impermissible.

For more detailed information concerning such attacks and how they exploit modern computer processors that use cache memory and speculative execution, see for example the following technical articles that are incorporated herein by reference as if expressly set forth:

Lipp et al, "Meltdown" arXiv:1801.01207 [cs.CR] (2018), published at https://meltdownattack.com/

Kocher et al, "Spectre Attacks: Exploiting Speculative Execution" arXiv: 1801.01203 [cs.CR] (2018), published at https://meltdownattack.com/

Yarom et al, "Flush+Reload: a High Resolution, Low Noise L3 Cache Side-Channel Attack," USENIX Security Symposium (2014).

In such contexts, the term "side channel" is a general term used to describe methods that are able to derive information about a processor that are outside of the processor's architectural specification. There are many kinds of side channels, including performance counters. Other examples include the processor making different sounds upon executing different instructions. The side channel space thus includes a wide range of differences between the logical architectural specification of the processor as defined by the processor's architects, and the processor's actual implementation as specified by its designers. Like burglars who break into a building through a crawlspace the architects never designed into the structure, it has become common for attackers to exploit—for nefarious purposes—various aspects of processor side channels in ways the processor architects and designers never contemplated or foresaw.

For example, modern processors often have performance metric counters that track how long it takes for a particular memory load to execute. As discussed above, if an attacker can learn how long it took for the data to load, he can sometimes use this information to learn the contents of the data. It is also possible by determining whether there is a miss in the cache memory for an attacker to intuit the content of the data itself such attacks can for example exploit the shared, inclusive last-level cache. The attacker may frequently flush a targeted memory location. By measuring the time it takes to reload the data, the attacker can determine whether the data was loaded into the cache by another process in the meantime. This is known as one type of "cache attack."

Figure 1:
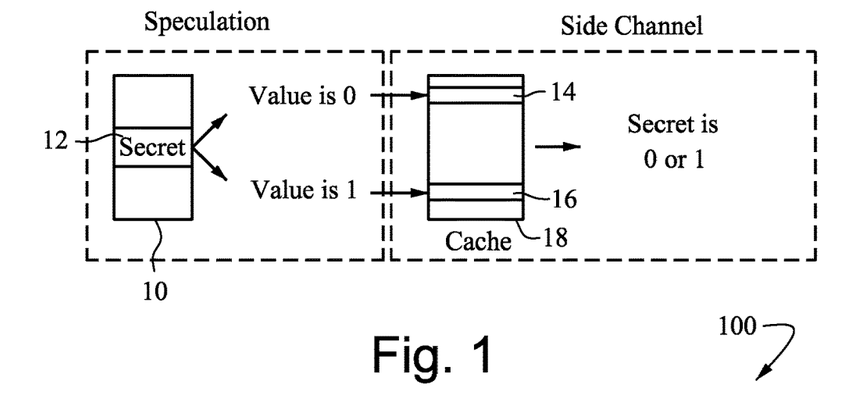
FIG. 1 shows an example non-limiting side channel attack based on speculative execution.

In more detail, FIG. 1 shows an example simplified scenario in which a memory 10 stores a secret 12. FIG. 1 shows speculative execution the attacker is controlling (i.e., access one memory location if the secret value is zero, and access a different memory location if the secret value is 1). FIG. 1 thus further shows that a first cache line 14 is written into cache memory 18 if a result of the speculative execution is zero, and a second cache line 16 is written into the cache memory if the speculative execution is one. The attacker can then use a side channel to detect which of the cache lines (the first cache line 14 or the second cache line 16) is present. From the result of this detection, the attacker can derive whether the secret 12 is zero or one. The side channel attack thus permits the attacker to detect which cache line is present without actually reading either cache line (reading either cache line would generate an exception because the memory access would be privileged), and learn the value of the secret without actually reading the secret value from memory (which the processor architecture typically successfully prohibits).

The general problem of unexpected data observation as a result of hardware speculation by the processor is very difficult to resolve. Correctly speculating which data the processor is going to access is a very large source of performance, with a wide variety of methods developed without regard to timing attacks. Attempting to enumerate all cases where the hardware speculates due to secret data and performs some observable timing effect is an intractable problem. Trying to eliminate all possible side channels is also intractable.

Prior attempted solutions have been to use explicit software barriers, for example ARM's ISB/DSB and x86's LFENCE. Unfortunately, this runs into three problems, namely these are expensive in performance, software generally doesn't know where to put them, and their use tends to be architecture specific causing headaches when implementations implement barriers differently with regards to speculation.

It is also common to use some combination of the physical address, virtual address, ASID (address space identifier), VMID (virtual machine ID), Exception Level (EL) or Privilege Level hashed in some way to form the final branch predictor index and tag. Such a hash won't avoid cross talk between mismatched ASID, VMID, ELs due to aliasing in the hash function, which a sufficiently informed attacker could exploit. Note that some types of virtual address aliasing may comprise a degenerate case of this type of cross talk, and as such the stated attack is unlikely to be contained to those implementations which have a virtually-indexed/tagged branch predictor. Demanding that all bits be used as part of branch predictor tags is die-area onerous, as it adds extra bits of tag storage to each entry in every branch predictor structure.

For protection of current implementations, it is possible to use the ARMv8 architecture Device-nGnRnE or Intel UC memory to store secrets which the programmer wishes to be hidden from these types of attacks. In particular, it is highly likely secret data stored in Device-nGnRnE memory (nGnRnE=non-gathering, non-reordering, non-easy write acknowledgement) is completely immune to all variants of this basic attack on existing processors. It is illegal to speculate into, or speculatively remove, accesses to such Device-nGnRnE memory, and thus it would be extremely difficult to build a compliant implementation which leaks Device-nGnRnE data in the manner described.

BRIEF DESCRIPTION OF THE DRAWINGS

The following detailed description of exemplary non-limiting illustrative embodiments is to be read in conjunction with the drawings of which.

DETAILED DESCRIPTION OF PREFERRED EMBODIMENTS

Example non-limiting implementations provide an improved architectural means to address attacks of this nature by defining a new memory type that is both cacheable and inaccessible by speculation. Example non-limiting embodiments provide mechanisms that disqualify certain sensitive data from being exposed through speculative execution. For example, non-limiting embodiments allow data which must be protected at a performance cost to be specifically marked. In a particular system, if the processor is told where secrets are stored in memory and forbidden from speculating on those memory locations, then the processor will ensure the process trying to access those memory locations is privileged to access those locations before reading and caching them.

As an architecture improvement, example non-limiting embodiments provide a memory type that is both cacheable and inaccessible by speculative instructions that would be useful in storing sensitive data in a manner immune to such attacks. While the performance penalty for using such a memory type would still be quite high (but not as high as using device memory or as compared to if the data weren't allowed to be stored in the caches), it would give programmers the option of protecting sensitive data with an assurance a new form of speculation won't expose them to an unexpected attack.

Separating permissions checks from the execution pipeline can have significant performance benefits. To give one example, nearly all forms of value speculation will perform this separation in some way. The result of the value predictor can often be resolved prior to the result of required permissions checks, and it is beneficial to have the processor continue forward with the predicted value assuming the permissions checks will return allowing the access. Intentionally precluding such optimizations on all memory operations is an onerous burden from a performance view.

Such implementations can be provided without requiring significant modifications of current processor designs. There is already a concept in many processors of cacheable memory types and non-cacheable memory types. In such arrangements, the processor may be permitted to speculate on non-cacheable memory types but is not permitted to store contents of such memory in the cache memory (the processor needs to keep track of speculative execution using some other mechanism). One potential kind of memory type is thus non-cacheable: it cannot be stored in the cache memory but must instead be retrieved from memory 104 each time the core 102 wants to access it. As one example, real time input data such as data from a video camera is typically not cached, but needs to be read directly each time it is needed because it is changing so rapidly.

Some processors also have mechanisms dictating that certain memory may be neither speculated on nor cached. Most modern processors thus already have mechanisms to deal with instructions that can be neither cached nor speculatively accessed. For example, a location in a FIFO buffer stored in an external device should generally not be read redundantly or speculatively. Thus, there is already a mechanism in many modern processors that will decline to speculatively execute certain types of instructions, but will also not cache those same instructions.

Example non-limiting embodiments herein designate memory types that may be cached but not speculated on. While there may potentially be other types of cache attacks that under certain circumstances could leak values that are stored in the cache as the result of privileged access, the non-limiting embodiments are not subject to attacks such as Meltdown and Spectre that exploit speculative execution. The non-limiting embodiments provide a further advantage that even particular memory types that cannot be speculated on can still be cached, thereby benefitting from lower memory access latency that caching may offer.

Example Non-Limiting Processor Architecture

Figure 2:
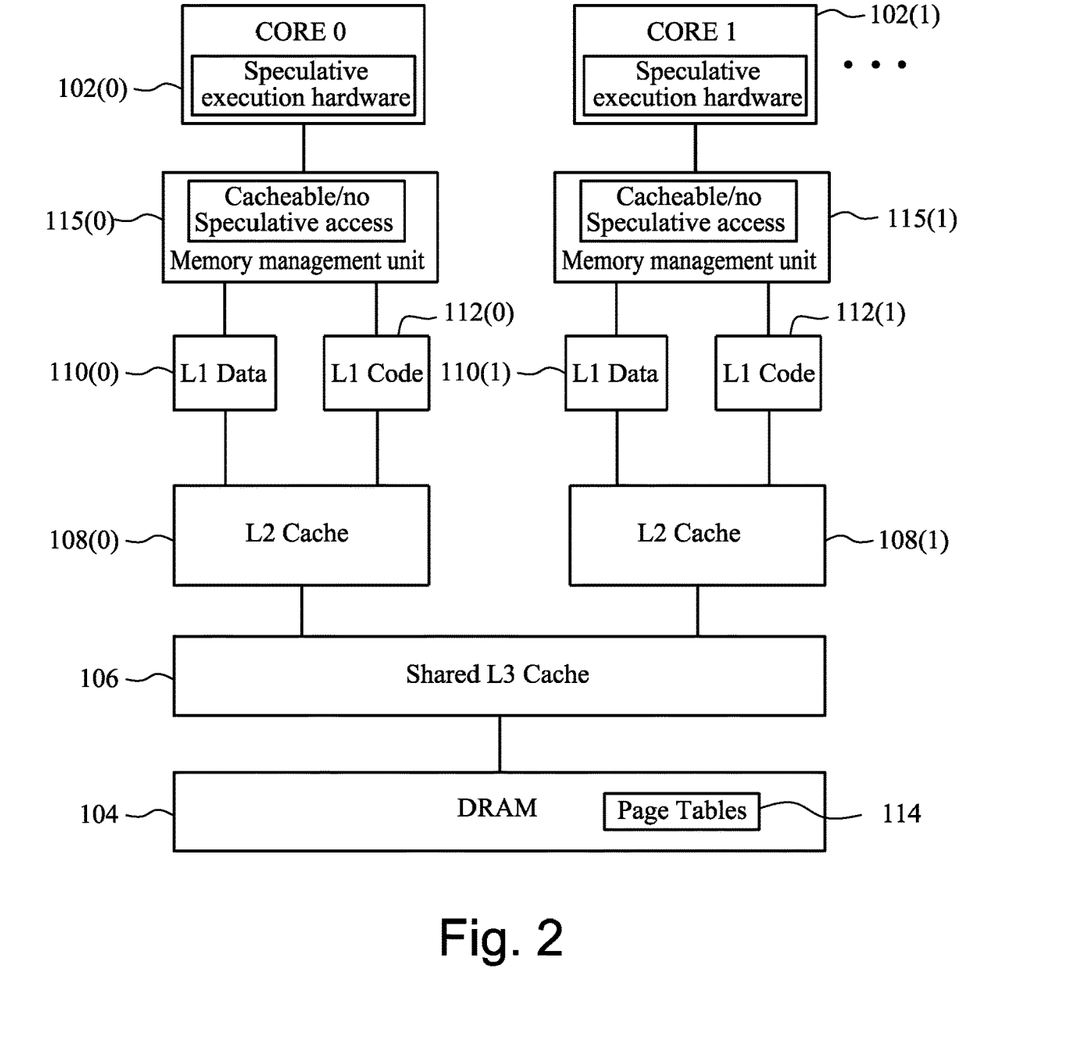
FIG. 2 shows an example system block diagram according to some embodiments.

FIG. 2 shows an example non-limiting architecture for a processor 100. In the example shown, the processor 100 has multiple cores such as a core 102(0), a core 102(1), and so on. When software running on one of the cores 102 requires data stored in DRAM memory 104, it initiates a "load" (from memory) command.

Cache Memory

The core 102 uses a memory architecture including a so-called "cache memory" to speed up loads from memory. As those skilled in the art understand, conventional "cache memory" has been used in high speed computer architectures for many years. The basic idea behind a cache memory is to place a small low latency memory close to a high speed processor, typically on the same silicon. The core 102 issues requests for data from the main system memory 104 by sending them through the cache memory system. The cache memory system retrieves the requested data from main memory, and stores the retrieved data in a small local memory the core can access quickly.

A typical cache memory system retrieves, stores and maintains data that an executing process needs to run. Retrieval into a typical cache memory is initiated by a process calling for that data from main memory 104. But instead of simply returning the retrieved data to the process, the cache memory system also maintains a copy of the data in local cache memory close to the process that is using the data. If the process needs the same data again (which it often may, due to a phenomenon known as "localized execution"), the cache memory system can provide it quickly without having to retrieve it again from main memory 104. When the executing process no longer needs the data (e.g., because it has made forward progress to another part of the process), the data can be evicted from the cache memory system to make room for other data the process now needs.

Home cooks will be familiar with the concept of a cache, since a typical home refrigerator constitutes a kind of a food cache. There are many different ingredients in the refrigerated section of your local food supermarket, but having to go all the way to the store each time you need any refrigerated ingredient would be very time-consuming. Instead, the home cook occasionally brings home from the supermarket specific ingredients likely to be needed in the next few days, and stores them in a home refrigerator. The home refrigerator is just a few steps from the sink and stove, so the ingredients it contains are easy for the cook to access quickly. The cook will need to replenish the contents of the home refrigerator periodically. And the cook may sometimes need to run to the store to pick up special ingredients that the home refrigerator does not contain.

A typical advantage of a cache memory is reduced latency—the time it takes to retrieve data from memory. It is usually much quicker for a process to obtain data from a local cache than to retrieve it from system memory. Because many processes tend to reuse the same data over and over again ("locality of reference"), it can be quite efficient to maintain a local temporary copy of data that the process can access much more quickly as compared to retrieving it from shared main system memory.

The particular non-limiting example shown in FIG. 2 has three levels of cache memory:

Level 1 (L1)
Level 2 (L2)
Level 3 (L3).

The L3 cache memory 106 in this example is the level of cache memory closest to the memory 104 and in this case is shared by the cores 102. Each core 102 may use its own L2 cache memory 108 to access the L3 cache 106. In the example shown, each core 102 also has its own dedicated L1 cache memory, this L1 cache memory being separated into an L1 data cache 110 and an L1 code cache 112.

If the data the core 102 is looking for is resident in the L2 cache 108, the L2 cache delivers the data to the L1 cache 110 for access by the core 102. If the requested data is not resident in the L2 cache 108, the L2 cache requests it from the L3 cache 106. If the needed data is present in the L3 cache 106, the L3 cache delivers it to the L2 cache 108 which in turn delivers it to the L1 cache 110 for delivery to the core 102. If the needed data is not present in the L3 cache 106, the data is requested from memory 104.

Each progressive memory level from the top to the bottom of the FIG. 2 diagram is associated with longer and longer latency. Retrieving data from the L1 cache 110, 112 is very fast. Retrieving data from the L2 cache 108 takes a bit longer. Retrieving data from the L3 cache 106 takes even longer. Retrieving data from memory 104 often takes much longer (e.g., 40 times longer or more to retrieve data from memory 104 than it takes to retrieve data from the L1 cache 110).

Virtual Memory System

The code running on core 102 typically uses "virtual memory" accesses to start a load from memory. As is well known, virtual memory is used to insulate the application software running on the core 102 from having to deal with the physical addresses of data and code stored in physical memory 104. Virtual memory divides physical memory into blocks, and enables these blocks to be assigned to different processes running on core 102. The operating system assigns each block in physical memory a virtual memory address. Virtual addressing translates the assigned virtual memory addresses to a real/physical storage locations somewhere (anywhere) in memory.

Virtual memory provides great flexibility. For example, from the application's perspective, it may appear that the memory locations the application is accessing are stored contiguously (all together) whereas in reality the corresponding physical memory locations are spread widely across the physical address space of physical memory 104. Virtual addressing also permits different processes for example to have the same views of their respective private virtual address spaces while sharing a common physical address space in a secure way. As an example, it's common for the kernel memory address space to be mapped into the virtual address space of each of several processes running on core 102.

The operating system maintains page tables 114 to map virtual addresses to physical addresses. FIG. 2 shows a simplified conceptual view of how page tables 11 are used by a processor and memory management unit (MMU) 115 architecture. Page tables 114 provide data structures maintained by the virtual memory system to store the mapping between the virtual addresses used by the applications and the physical addresses used by the physical memory 104. The virtual addresses are used by the accessing process (e.g., a memory load request from software running on core 102), whereas the physical addresses are used by the physical (hardware) memory 104. In the example shown, page tables 114 store pages that translate between the virtual memory addresses used by the core 102 and the physical memory addresses of memory 104. As is well known, it is possible to reduce latency of access to page table 114 entries by using a translation lookaside buffer (TLB) memory cache that stores recent translations of virtual memory to physical memory.

Typically, L1 cache 110 stores the data and code retrieved from memory 104 using its virtual addresses. One type of example L1 cache 110, 112 is a so-called "VIPT" or virtually-indexed, physically tagged cache. If the data requested by core 102 is not already resident in the L1 cache 110, 112 (i.e., because of a previous retrieval of that same data by the core), the page table 114 is used to translate the virtual address(es) of the load the core 102 is requesting into a physical address(es) used by memory 104. Note that even though the L1 Data and L1 Code caches 110, 112 are virtually tagged, accesses still have to be verified with the physical addresses translated using information from page tables 114. Load requests get their virtual addresses translated by hardware (memory management unit), which accesses page tables 114 in memory 104 to perform the virtual→physical address translation. The L2 cache 108 and L3 cache 106 are both physically (as opposed to virtually) indexed, physically tagged caches and thus use the same physical addresses the memory 104 uses.

Memory Protection and Privileged Memory Access

The memory management system of processor 100 is designed so that applications running on the core 102 cannot necessarily access every memory location in memory 104. For example, by providing each software process with its own page table, it is possible to map its process's virtual addresses to unique physical addresses. This prevents programs from accessing each other's data.

Typically, a portion of the physical address space is also reserved exclusively for the operating system kernel. In most modern processors, there is a privileged access scheme implemented that gives privileged software running on core 102 access to data and instructions within memory 104 whereas less privileged software is denied such access. For example, the kernel of the operating system executing on core 102 is typically able to access any data or codes stored in memory 104. On the other hand, a typical user application running on core 102 is denied access to certain areas of memory 104 that are designated as privileged access areas. The privileged access scheme is typically implemented by providing access rights in the page tables 114. When software running on a core 102 requests a load from memory 104, the memory management unit uses access rights the page tables 114 specify to determine whether the requesting software has the appropriate privilege level and permissions to access the memory location. If the requesting software is allowed to access the memory location, the system 100 will retrieve the requested information from the associated memory location within memory 104 and return it to the requesting software running on core 102. If, on the other hand, the requesting software running on core 102 is not allowed to access the memory location, the memory management unit will detect this based on the access rights the page tables 114 specify, and deny access to that particular memory location, causing a fault. Such a memory access scheme for example can prevent user applications from overwriting sensitive operating system code and data, and also can protect the secrecy and security of sensitive data stored in memory 104.

Core 102 in one example thus has the concept of privileged software. In one arrangement, user privileges are lowest privilege level, and kernel privileges are the next highest level of privilege. It is easy to see how this can work for write access: only higher privilege levels are permitted to write to memory locations that are designated at higher privilege levels. Thus, a process running on core 102 that has user privileges will be forbidden from writing to a memory location designated as requiring kernel privileges.

Read access works as follows: if the process running on core 102 that has user privileges tries to read from a memory location designated as requiring kernel privileges, the operating system (kernel) forbids the memory load from returning the value to the user process and instead generates a fault. This is how the core 102 is designed to work architecturally, but it turns out that core 102's implementation doesn't work quite this way.

Speculative Execution

Processor designers have taken great pains to make all aspects of processor operation work as quickly as possible. The architecture shown in FIG. 2 reduces memory access latency. Another independent technique known as "speculative execution" increase the effective speed at which core 102 executes software.

One way to understand speculative execution is through the following analogy. Suppose you're a car mechanic asked to inspect a customer's car. You put the car up on the lift, carefully inspect the car and determine the front brake pads are worn and need replacing. You tell the office to call the customer to give a cost estimate and get the customer's consent to replace the brakes. In your experience, customers are likely to authorize this particular repair, so you decide to leave the car up on the lift, order replacement brake pads, take off the front tires and clean the components with compressed air. If the customer declines the work, you will need to put the tires back on and return the replacement brake pads. But if the customer authorizes the work, you have already made progress on the repair and can complete it more efficiently.

Figure 3:
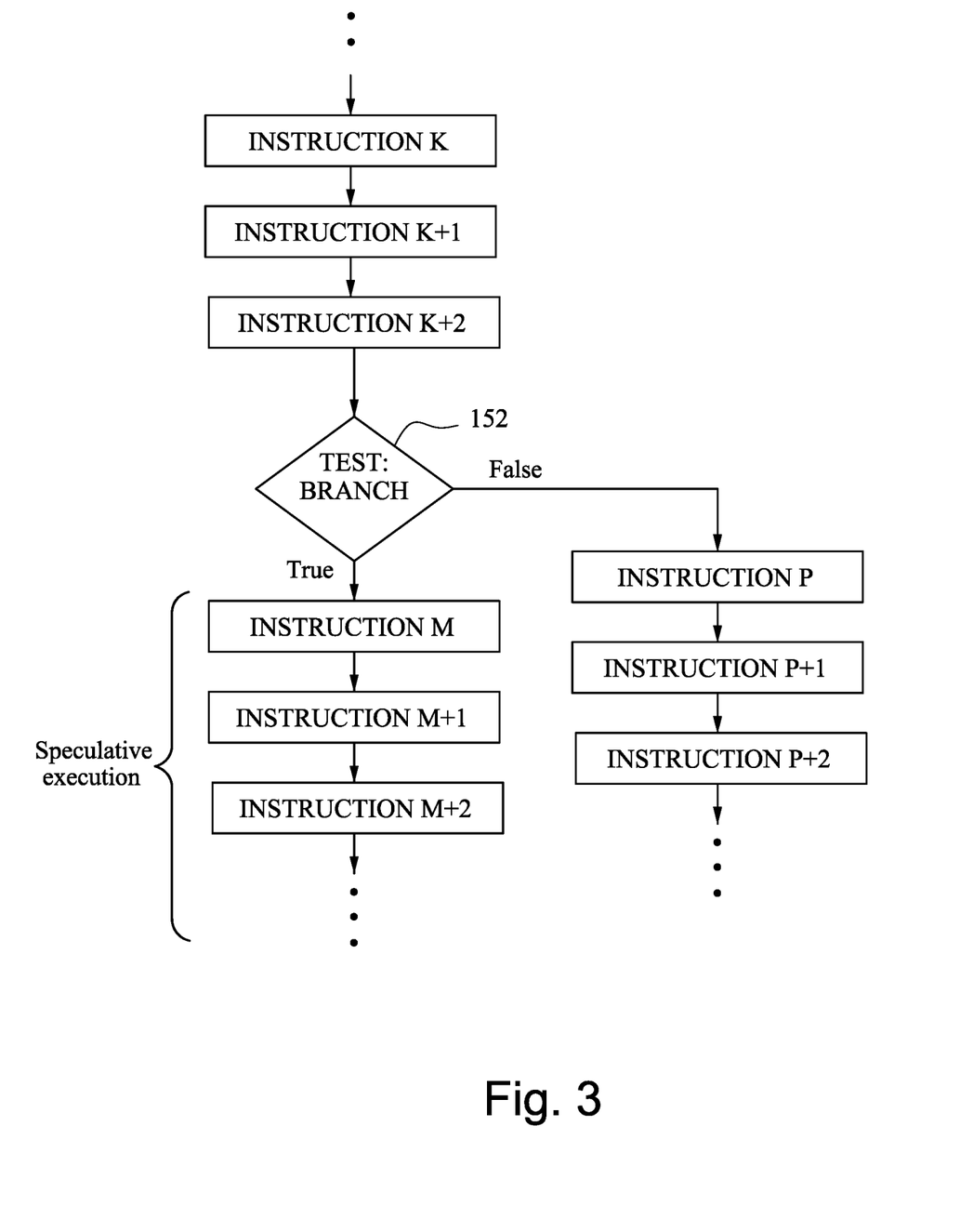
FIG. 3 shows an example flowchart according to some embodiments.

Speculative execution works in a similar way. FIG. 3 shows an example code fragment including instructions k, k+1, k+2; a branch instruction; instructions m, m+1 for one path of the branch; and instructions p, p+1 for instructions in another path of the branch. Instructions k, k+1, k+2 are so-called inline instructions that are executed in sequence by core 102. Suppose after executing these inline instructions, the core encounters a branch instruction 152 that conditionally executes either instructions m, m+1 or instructions p, p+1 depending upon the results of a test. For example, core 102 will execute instructions m, m+1, . . . if the test result is true, and will instead execute instructions p, p+1, . . . if the test result is false. Now suppose the value the branch 152 needs to test is not immediately available. Perhaps it needs to be retrieved from memory 104. Alternatively, it could be a user value that needs to be input by the user. Or it could be a calculation result that requires a significant amount of time to compute using for example a math coprocessor. For whatever reason, the core 102 is unable to immediately evaluate the result of the branch test 152, but must instead wait until those results are available.

Rather than screeching to a halt and waiting for the outcome of the branch 152 decision, core 102 begins executing down one of the two possible paths. This execution is called speculative because which path is the correct one cannot be known in advance. Accordingly, instead of just waiting, core 102 executes instruction m, m+1, m+2, and so on—often based on statistics and past history that indicate which path the process is most likely to take. Core 102 thus makes headway on a path that may turn out to be the wrong one and the results of which may have to be discarded. Once the result of the branch 152 task becomes known, core 102 either continues with the path it began to execute speculatively, or abandons those results and begins executing the valid path.

An interesting aspect of speculative execution is that it is being performed by the processor's speculative execution hardware rather than by the application itself. Thus, speculative execution may benefit from the processor's speculative execution hardware which can access any memory location irrespective of privilege level. This isn't always true (it depends on the implementation, and implementations which don't do this still have a problem). Perhaps more importantly, the speculation isn't under software's control, and can produce results software would not expect. For example, if (foo<1) {load array[foo];} software would expect to never load out of bounds; but on the speculative path it could go anywhere. This leads to problems, because privileged software (with access to secrets) can unwittingly access its own secrets and leak them to others by creating cachelines on the speculative path which are dependent on the value of a secret, even if permissions are being checked at all times. The fact that this method (and any other that creates cachelines/memory accesses based on a secret on the speculative path) can still leak the secret makes the problem so insidious.

Thus, in various scenarios, values requested by speculative execution would be retrieved from memory and stored in the L1 cache 110, 112 irrespective of the privilege level of the application. Subsequently, when the branch test 152 result is known, the access permissions specified by the page tables 114 determine whether the application is allowed to retrieve the instructions and data (which are already stored in the L1 cache 110, 112 as result of speculative execution). If the application does have access, execution proceeds. On the other hand, if the application is denied access to the privileged data or instructions now stored in the L1 cache 110, 112, the processor generates an exception, and the security of the retrieved information is protected because it never leaves the L1 cache. At least that is how the processor architects designed the processor to behave. This assumption is sound based on the architecture of the processor, but it does not take into account the microarchitectural features of the particular way the processor is actually implemented. Just like the elegant building with an undocumented crawlspace, there is a potential that an attacker can use the microarchitectural state to leak information from the cache memory via a side channel attack.

In more detail, cores 102 typically have multiple specialized pipelined execution units that can execute in parallel. With multiple specialized execution units, many execution operations may be executing at once. Furthermore, due to dependencies and bottlenecks in execution units, the operations need not execute in the same order as they were initially presented. When an operation is finished executing, the result is added to a buffer, thereby resolving dependencies with other operations. Results of speculative execution that are not needed can be flushed from the buffer and never stored in registers. This is especially true if the instruction execution generates an interrupt or fault due to an unauthorized privileged memory access. However, it becomes possible a second instruction will also execute speculatively and change the microarchitectural state of the core 102 in a way that can be detected.

Cache Attacks Based on Speculative Execution can Circumvent Privileged Memory Protection In one kind of attack, the attacking process running on the core 102 arranges to have the core read data from memory 104 that the attacking process does not itself have permission to read. But the attacker hopes that the core 102 will speculatively read that privileged data before the core 102 generates a privilege exception. The core 102 will eventually, as discussed above, decline to return the privileged data to the attacking process and instead generate an exception. However, the attacking process can meanwhile cause the core 102 to perform a second speculative access and based off of where that second access goes, derive what the data the core 102 speculatively read from memory in the first speculative access must have been. The core 102 thus stops the attacking process from accessing the privileged data directly, but the attacker can use side channel leakage from the cache to derive what the data must have been. If the attacker can derive what the data must have been, that's just as good as reading the data. This attack appears to be indirect and convoluted, but is in fact effective and powerful. All sorts of highly sensitive data including for example security keys, passwords, etc. can be leaked from privileged memory using such cache attacks.

Many or most modern processors speculatively access data in order to achieve higher performance. Fundamentally, it is a difficult challenge to control all the forms of speculation to make sure none of them insert anything into cache memory that could then become visible.

Figure 4:
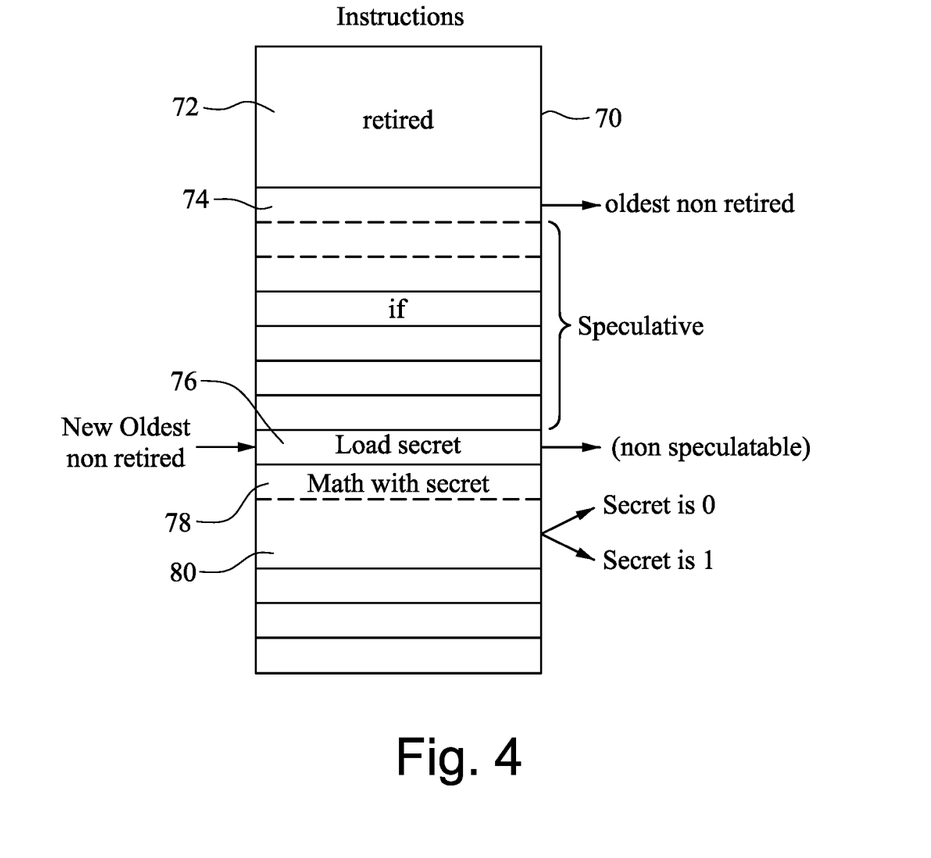
FIG. 4 shows an example instruction execution stream according to some embodiments.

Present Non-Limiting Embodiments Take a Different Approach that Marks Memory as Non-Speculative but Cacheable One non-limiting implementation marks memory types that core 102 is not permitted to speculate into. FIG. 4 shows an example instruction stream 70 stored in system 100. Retired instructions 72 have already been executed. The oldest non-retired instruction 74 is the instruction the core 102 is executing right now. The subsequent instructions in instruction stream 70 are potentially ones that core 102 could execute speculatively. These subsequent instructions may or may not be executed (e.g., due to branch instructions such as "if") and thus may or may not become retired instructions.

Now suppose the instruction stream 70 includes a load instruction 76 that accesses a secret. What would normally happen if the load instruction 76 were both cacheable and speculatable: as soon as the core 102 determines that it is likely that the portion of the instruction stream that contains the load instruction will be executed, the core 102 will speculatively initiate a load from memory, access the secret and store it in the cache. Once the secret is stored in the cache, the core 102 will potentially then speculatively execute a further instruction 78 that will perform an operation such as math on the secret. A subsequent load 80 could be speculatively executed to implicate two different cache lines in the cache memory, as discussed above, depending on whether the secret is 0 or 1. This operation is vulnerable to a side channel attack such as Meltdown or Spectre. In this context, executable memory generally refers to memory which can contain speculative instructions, whereas the threat is whether instructions stored somewhere else can access a particular secret location in memory.

In the example non-limiting embodiment, in contrast, the load instruction 76 will not be speculatively executed. Instead, when the speculative execution unit of core 102 gets ready to speculatively execute the load instruction 76, it determines that it cannot perform the operation because the load of the secret is non-speculatable. It therefore will not perform the load. Accordingly, the math operation 78 also will not be speculatively executed, and neither will the test and write 80 to different cache lines. The core 102 instead waits because it is not allowed to speculatively execute these instructions as this load has been marked as being ineligible for speculative execution.

The core 102 may, instead of just waiting, begin speculatively executing other instructions that don't need or depend on the result of load instruction 76. It is in fact not unusual for an attempted memory access to fail for various reasons, and core 102 includes conventional mechanisms to handle such memory access failures gracefully without crashing or otherwise discontinuing normal operations. For example, in a normal case, the core 102 may try to perform a load from memory 104 (e.g., because of a cache miss or because the memory is shared and is itself temporarily unavailable), the core may need to wait for the value to become available in the cache. A conventional core 102 already has mechanisms available to handle such unavailability scenarios. The core 102 is provided with a new state: "I'm just waiting to be non-speculative." Whether the core 102 will go on and do other, independent loads or just continue to wait to be non-speculative is processor-dependent.

Meanwhile, the oldest non-retired instruction 74 moves up in the instruction stream. If a branch (or other) instruction directs execution away from the load instruction 76, the instruction will never be executed and the secret will never be cached. However, once the load instruction 76 becomes the current oldest non-retired instruction, core 102 attempts to non-speculatively execute the load instruction. As in a conventional case, the core 102 will check to ensure that the privilege level of the application is sufficient to access the memory location addressed by the load instruction 76. If the privilege level is not sufficient, then the core 102 will not access the memory location but will instead generate an exception. If the privilege level is sufficient, the core 102 will execute the load instruction 76, which will (as normal) cause the secret to be cached in the cache memory and supplied to the core 102 for execution (assuming the secret is not already resident in the cache due to a previous non-speculatively executed load). The fact that the load could not be speculatively executed previously will cause some additional delay, but this is a worthwhile tradeoff to ensure the secret is not leaked from the cache through a side channel. The fact that the secret is eventually cached in the cache memory is not problematic because the caching occurs as a result of non-speculatively executing an instruction that is authorized to access the secret. In many non-limiting implementations, the processor can be even more aggressive than this. For example, the processor can cache the memory location due to speculatively executing the instruction, but simply not allow that cached data to become available for use by later speculatively executing instructions until the original load is non-speculatively executed. It's fine for the secret to be in the cache, but it's not fine for the secret to be used in the dependent math, and definitely not fine for the secret to be used to create a cacheline dependent on the value of the secret. Should any further instructions in the stream without such authorization attempt to access the secret stored in the cache, they will not be executed speculatively (because the secret is marked as being not subject to speculative execution) and in fact will never be executed because they do not have the authorization to access the secret.

Memory Architecture Supporting New Memory Type

Figure 5:
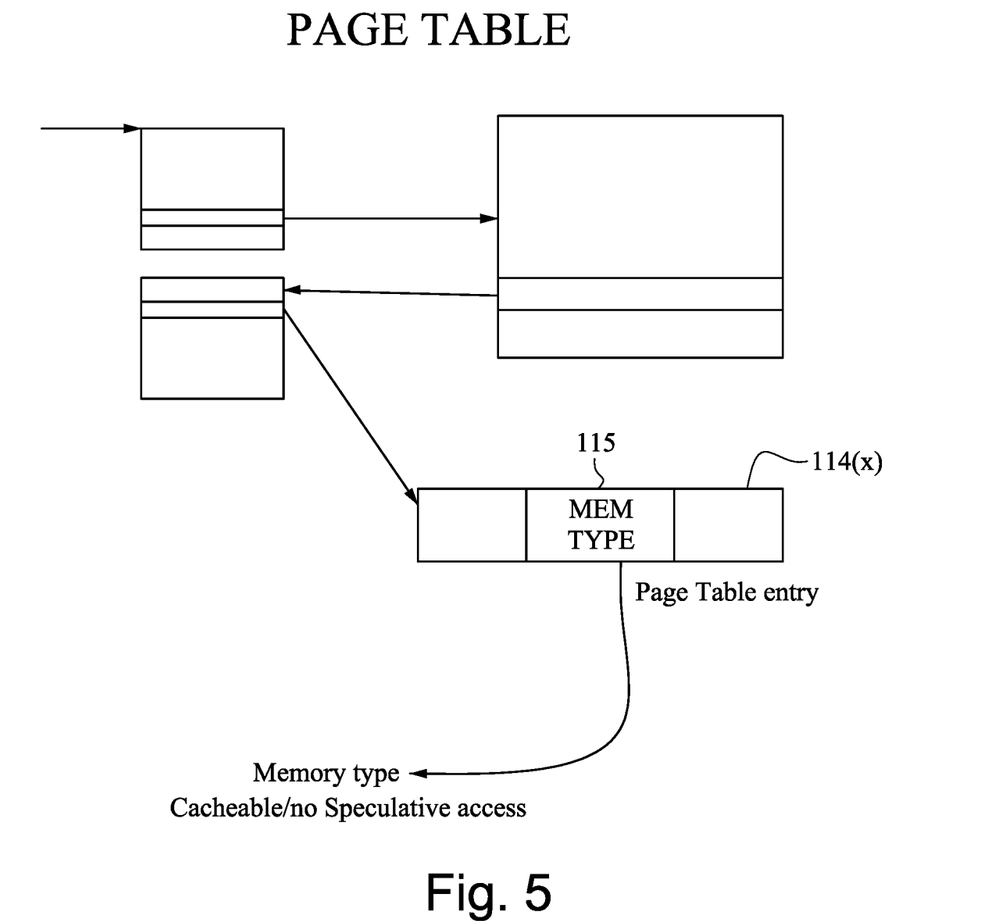
FIG. 5 shows an example memory type designation according to some embodiments.

FIG. 5 shows an example non-limiting block diagram of how to set up an example non-speculatable-but-still-cacheable memory types. FIG. 5 shows a typical page table hierarchy which includes a page table entry (PTE) 114(*x*) in page table 114. The PTE 114 will include a memory type field that is coded to indicate to the core 102's speculative execution unit: NO speculative execution, but which will not prevent the memory management system from caching the value in cache memory. This allows the virtual addressing scheme to mark particular memory locations or blocks of memory locations as being non-speculative but cacheable. Other arrangements might mark the physical addresses themselves as being of this particular memory type. Thus, either virtual addresses, physical addresses or both could be so marked, identified, tagged, or otherwise designated. One may so mark a single memory location, a range of memory locations, a block of memory locations, a page or other subdivision of memory locations, a single memory address, a range of memory addresses, a block of memory addresses, a page or other subdivision of memory addresses, or even a physical or virtual memory device or part thereof. The markings can be hard coded, defined by hardware and/or software such as by register contents, and/or programmable.

Another alternative embodiment would be a particular instruction format that signals that the memory locations accessed by the instruction can be cached but not accessed by speculative executions of the instruction. For example, an additional bit value in a memory load opcode or elsewhere in the instruction format can indicate "non-speculative" but without restricting the results from being cached. If such a mechanism were used, then there might need to be a further restriction that the secret stored in memory could be accessed only using that non-speculative instruction type.

Data protected by the example non-limiting embodiment could be any kind of sensitive information such as private keys, passwords, bank account information, photographs or other images, or any other information. System 100 may provide processing for a user device, a shared cloud device, a network router, an embedded processor, an autonomous vehicle computer, an artificial intelligence neural network, or any other kind of computing device.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of accessing memory comprising:
   determining whether a memory location is marked as being cacheable but not accessible by speculative execution of instructions; and
   if said determining determines the memory location is marked as cacheable but not accessible by speculative execution of instructions, allowing contents of said memory location to be cached and accessed by non-speculative execution of instructions but disallowing access to the memory location contents by speculative execution of instructions.

2. The method of claim 1 wherein said determining is based on virtual memory page tables.

3. The method of claim 1 wherein said determining is based on memory type.

4. The method of claim 1 wherein said determining is based on the memory location being within a certain region of memory.

5. The method of claim 1 wherein said determining is based on the memory location being within a predefined fixed region of memory.

6. The method of claim 1 wherein said determining is based on type information a memory management device accesses from a stored page table.

7. The method of claim 1 wherein said determining is based on information stored in a translation lookaside buffer.

8. The method of claim 1 wherein said determining is based on an instruction format.

9. The method of claim 1 wherein disallowing access includes denying speculative load access to the memory location to prevent unauthorized disclosure of secret memory contents.

10. The method of claim 1 wherein disallowing access includes denying speculative execution of instructions stored on a cacheline.

11. A processor comprising:
a memory management system that determines whether a memory location is designated as being cacheable but not accessible to speculatively-executed instructions and allows a memory location so designated to be cached; and
speculative execution hardware configured to disallow access to the memory location by speculatively-executed instructions if said memory location is determined as being cacheable but not accessible to speculatively-executed instructions.

12. The processor of claim 11 wherein said memory management system uses virtual memory page tables to determine whether a memory location is designated as being cacheable but not accessible to speculatively-executing instructions.

13. The processor of claim 11 wherein said memory management system determines based on memory type.

14. The processor of claim 11 wherein said memory management system determines based on the memory location being within a predetermined secure memory range.

15. A page table storage comprising:
at least one bit storage specifying whether a memory location is cacheable but not accessible to speculatively-executing instructions to thereby allow the memory location to be cached but not accessed by speculatively-executing instructions and to thereby prevent the memory location from being cached if not already cached.

16. A memory accessing arrangement, comprising:
a memory location; and
a memory access controller indicating that said memory location is both (a) cacheable and (b) inaccessible to speculatively-executing instructions, wherein a processor attempting to access said memory location is prevented, in response to the indication that said memory location is both (a) cacheable and (b) inaccessible to speculatively-executing instructions, from accessing data associated with said memory location when said processor is operating in a speculative execution mode and speculatively-executing instructions.

17. A processor-implemented method of preventing speculative access to data, said method comprising:
issuing an instruction comprising a memory access to an address;
determining that said processor is executing said instruction speculatively;
identifying a memory type of said address; and
if said memory type is identified as cacheable but inaccessible by speculative execution of instructions, preventing said speculatively-executing instruction from accessing memory at said address and/or from accessing data associated with said address.

18. The method as described in claim 17, wherein said identifying a memory type of said address comprises reading an encoded memory type value from a page table and/or a translation lookaside buffer.

19. The method as described in claim 17, wherein said determining comprises determining said memory instruction is part of a predicted path after a branch whose prediction has not been validated.

20. The method as described in claim 17, wherein said determining comprises determining said memory instruction is part of a speculative execution path.

21. The method as described in claim 17, wherein said memory instruction is a memory load instruction.

22. The method of claim 17 wherein a format of an instruction indicates said memory type.

23. The method of claim 17 wherein said identifying is performed at least in part using information from a page table.

24. A processor comprising:
a pipelined execution hardware that speculatively executes instructions;
a page table that indicates whether a memory location is cacheable but not accessible by speculatively-executing instructions; and
memory access hardware that, in response to said page table indicating the memory location is cacheable but not accessible by speculatively-executing instructions, allows caching of contents of said memory location but disallows access to the contents by any said speculatively-executed instructions.

* * * * *